(12) United States Patent
Liu et al.

(10) Patent No.: US 7,813,108 B2
(45) Date of Patent: Oct. 12, 2010

(54) ELECTROCHEMICAL CAPACITOR WITH CARBON NANOTUBES

(75) Inventors: Chang-Hong Liu, Bei-Jing (CN); Ding Wang, Bei-Jing (CN); Shou-Shan Fan, Bei-Jing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 331 days.

(21) Appl. No.: 12/006,317

(22) Filed: Dec. 29, 2007

(65) Prior Publication Data
US 2009/0116170 A1 May 7, 2009

(30) Foreign Application Priority Data
Nov. 2, 2007 (CN) .................. 2007 1 0124250

(51) Int. Cl.
*H01G 9/00* (2006.01)

(52) U.S. Cl. .................. 361/523; 361/516; 361/519; 361/525; 361/528; 361/529

(58) Field of Classification Search .................. 361/523, 361/502–504, 508–512, 516–519, 525–530, 361/540–541
See application file for complete search history.

(56) References Cited

U.S. PATENT DOCUMENTS

| | | | |
|---|---|---|---|
| 6,205,016 B1 * | 3/2001 | Niu .................... | 361/503 |
| 6,432,866 B1 * | 8/2002 | Tennent et al. ........... | 502/180 |
| 6,790,425 B1 | 9/2004 | Smalley et al. | |
| 7,160,615 B2 * | 1/2007 | Iwaida et al. ............. | 428/403 |
| 7,248,460 B2 * | 7/2007 | Omura et al. ............. | 361/502 |
| 2002/0048143 A1 | 4/2002 | Lee et al. | |
| 2002/0172639 A1 | 11/2002 | Horiuchi et al. | |
| 2003/0185741 A1 | 10/2003 | Matyjaszewski et al. | |
| 2004/0053780 A1 | 3/2004 | Jiang et al. | |
| 2005/0002850 A1 | 1/2005 | Niu et al. | |
| 2005/0081983 A1 | 4/2005 | Nakayama et al. | |
| 2006/0098389 A1 | 5/2006 | Liu et al. | |
| 2007/0041887 A1 | 2/2007 | Veedu et al. | |

(Continued)

FOREIGN PATENT DOCUMENTS

CN 1317809 10/2001

(Continued)

OTHER PUBLICATIONS

Frackowiak E et al, "Electrochemical storage of energy in carbon nanotubes and nanostructured carbons", Carbon, Elsevier,Oxford,GB, vol. 40, No. 10, Aug. 1, 2002,pp. 1775-1787.

*Primary Examiner*—Nguyen T Ha
(74) *Attorney, Agent, or Firm*—Jeffrey T. Knapp

(57) ABSTRACT

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are in a CNT film structure, wherein the CNT film includes a number of CNTs packed closely, entangled and interconnected with each other, and disorderly arranged. The electrolytic capacitor is a high-performance capacitor.

20 Claims, 4 Drawing Sheets

U.S. PATENT DOCUMENTS

| | | | |
|---|---|---|---|
| 2007/0076349 | A1 | 4/2007 | Dementiev et al. |
| 2007/0148962 | A1 | 6/2007 | Kauppinen et al. |
| 2007/0166223 | A1 | 7/2007 | Jiang et al. |

FOREIGN PATENT DOCUMENTS

| | | |
|---|---|---|
| CN | 1623210 | 6/2005 |
| CN | 1770344 | 5/2006 |
| JP | 2005286008 | 10/2005 |
| JP | 2007048907 | 2/2007 |
| JP | 2007081384 | 3/2007 |
| JP | 2007145634 | 6/2007 |
| WO | WO2007047185 | 4/2007 |
| WO | WO2007053155 | 5/2007 |
| WO | WO2007078005 | 7/2007 |

* cited by examiner

US 7,813,108 B2

ELECTROCHEMICAL CAPACITOR WITH CARBON NANOTUBES

RELATED APPLICATIONS

This application claims all benefits accruing under 35 U.S.C. §119 from China Patent Application No. 200710124250.6, filed on Dec. 2, 2007 in the China Intellectual Property Office. This application is related to commonly-assigned, co-pending application: U.S. patent application Ser. No. 12/006,385, entitled "ELECTROCHEMICAL CAPACITOR WITH CARBON NANOTUBES", filed Dec. 29, 2007 and U.S. patent application Ser. No. 12/006,304, entitled "ELECTROCHEMICAL CAPACITOR WITH CARBON NANOTUBES", filed Dec. 29, 2007.

BACKGROUND

1. Field of the Invention

The invention relates to capacitors, particularly, to a electrochemical capacitor with carbon nanotubes.

2. Discussion of Related Art

Conventionally, capacitors used in electric circuits includes electrolytic capacitor, ceramic capacitors, and like. Capacitors provide energy storage as other energy storage devices, such as batteries or fuel cells. Capacitors store energy in the electric field between two oppositely charged parallel plates, which are separated by an insulator. The amount of energy a capacitor can store increases as the area of conducting plate increases, the distance between the plates decreases, and the dielectric constant of the insulating material increases. The electrolytic capacitor stores energy by charge separation across a thin insulating oxide film that is often formed by a controlled electrolytic oxidation process at an appropriate metal. Generally, a volumetric capacitance density of electrolytic capacitor is improved by using porous electrodes to create a large effective plate area.

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). One of the characteristics of CNTs resides in that the aspect ratio of length to diameter is very large. In addition, the electric conductivity of carbon nanotubes is very high and allows a current flow at a current density of 100 MA/cm·sup·2 or more. Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. Further, the carbon nanotubes have high elasticity, high resiliency and high chemical stability. These various and excellent characteristics tend to make CNTs ideal candidates for being used in field emission electronic devices, flat displays, as a hydrogen storage, and the like.

A new type of electrolytic capacitor using CNTs is disclosed. However, these CNTs are merely in contact with one another in a parent material. Therefore, it is difficult for the CNTs to provide stable electric conductivity and higher volumetric capacitance density.

What is needed, therefore, is a flexible electrolytic capacitor, which has stable and high electric conductivity, good charging/discharging property, and high volumetric capacitance density.

SUMMARY

An electrolytic capacitor includes a first electrode, a second electrode opposite to the first electrode, a separator sandwiched between the first electrode and the second electrode, a cell accommodating the first electrode, the second electrode and the separator, and an electrolytic solution filled into the inner space of the cell, with the first electrode, the second electrode and the separator immersed into the electrolytic solution. The first electrode and second electrode are in a CNT film structure, wherein the CNT film includes a number of CNTs packed closely, entangled and interconnected with each other, and disorderly arranged.

Compared with the conventional electrolytic capacitor, the present electrolytic capacitor has the following advantages: firstly, the CNT film has a high and stable electric conductive property, and the electrolytic capacitor has low internal resistance and good charging/discharging property. Secondly, the CNTs are uniformly dispersed in the CNT film, and thus the electrolytic capacitor has good reproducibility. Thirdly, the CNT film forms a porous structure, and then the interfacial surface area between the CNT film and the electrolytic solution is high, which results in a high energy density and volumetric capacitance density of the electrolytic capacitor. Fourthly, the CNT film is a thin and free-standing structure, and the electrolytic capacitor is flexible.

Other advantages and novel features of the present ion source element will become more apparent from the following detailed description of preferred embodiments when taken in conjunction with the accompanying drawings.

BRIEF DESCRIPTION OF THE DRAWINGS

Many aspects of the present electrolytic capacitor can be better understood with reference to the following drawings. The components in the drawings are not necessarily to scale, the emphasis instead being placed upon clearly illustrating the principles of the present f electrolytic capacitor.

Figure 1:
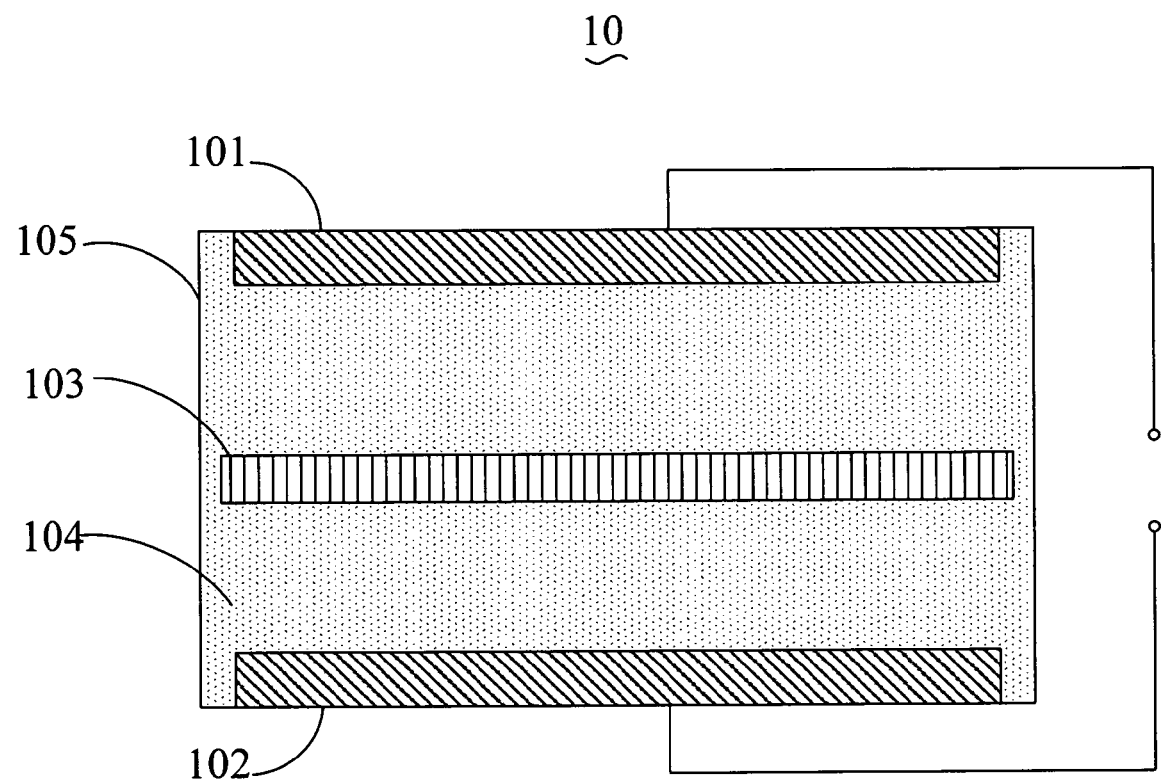
FIG. 1 is a schematic, cross-sectional view, showing the present electrolytic capacitor.

Corresponding reference characters indicate corresponding parts throughout the several views. The exemplifications set out herein illustrate at least one preferred embodiment of the present electrolytic capacitor, in one form, and such exemplifications are not to be construed as limiting the scope of the invention in any manner.

DETAILED DESCRIPTION OF PREFERRED EMBODIMENTS

Reference will now be made to the drawings to describe the preferred embodiments of the present electrolytic capacitor, in detail.

Referring to FIG. 1, an electrolytic capacitor 10 includes a first electrode 101, a second electrode 102 opposite to the first electrode 102, a separator 103 disposed between the first electrode 101 and the second electrode 102, an electrolytic solution 104 and a cell 105 accommodating all above elements therein.

The inner space of the cell 105 is filled with the electrolytic solution 104, and the first electrode 101, the second electrode 102 and the separator 103 are immersed into the electrolytic solution 104.

The separator 103 is an insulating porous material, composed of polymer material such as polyethylene, polypropylene, and polyolefin, or of nonwoven fiber material such as cellulose, polyester, and polypropylene. The separator 103 is configured for preventing electrical contact between the first electrode 101 and second electrode 102 and allowing the ions therethrough.

The electrolytic solution 104 can be anyone of known electrolytic solutions used in electrochemical capacitors, such as aqueous electrolytic solution or organic electrolytic solution.

The first electrode 101 and second electrode 102 includes a number of CNTs to form a network/microporous film structure. A length of the CNTs is more than 100 microns (μm). The CNTs are uniformly dispersed and disorderly arranged in the CNT film, and thus the electrolytic capacitor 10 has good reproducibility. The CNTs are entangled and interconnected by van der Waals attractive force. Thus, the CNT film has a high and stable electric conductive property, and the electrolytic capacitor 10 has low internal resistance and good charging/discharging property. In addition, the CNT film forms a porous structure with a pore size of less than 1 micrometer, and then the interfacial surface area between the CNT film and the electrolytic solution 104 is high, which results in a high energy density and volumetric capacitance density of the electrolytic capacitor 10. Since the CNT film is in a thin and free-standing structure, the first electrode 101 and second electrode 102 can be flexible, and then the electrolytic capacitor 10 can be formed like a thin and flexible film, which make the electrolytic capacitor 10 can be employable in IC cards, portable device, etc.

Figure 2:
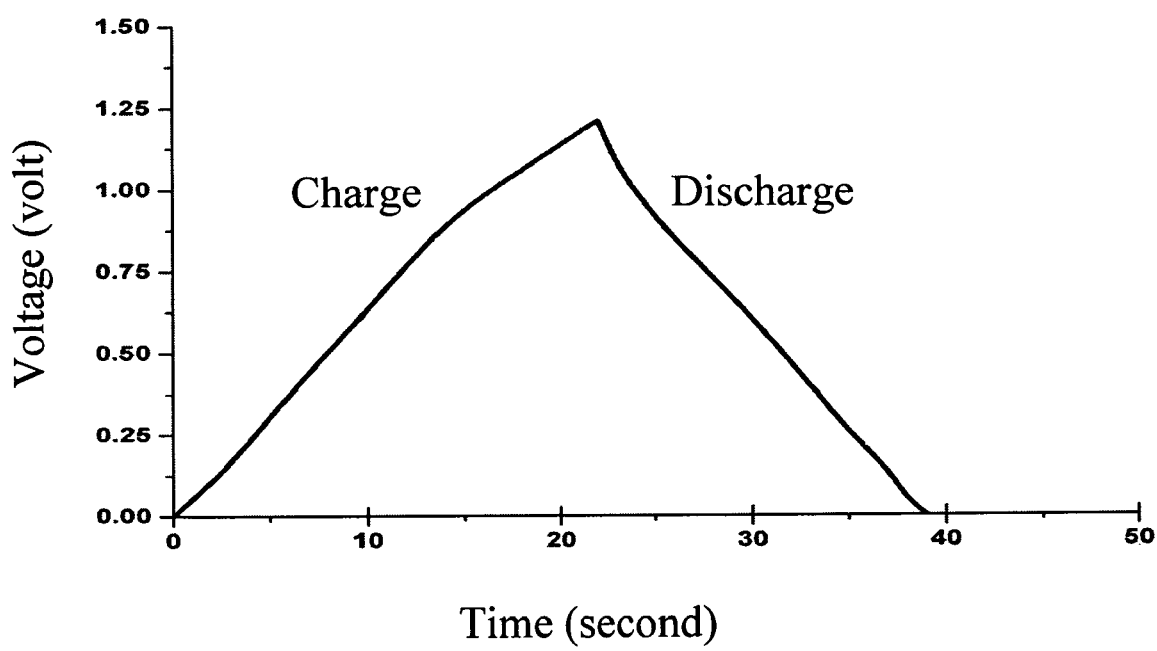
FIG. 2 is a charging/discharging graph of the present electrolytic capacitor.

Referring to FIG. 2, the charging/discharging graph of the present electrolytic capacitor shows a symmetrical structure under a current of 3 microamperes (mA), and the present electrolytic capacitor has a good reproducibility. The volumetric capacitance density thereof is more than 100 farads per gram.

A length and width of the CNT film is not limited and can be determined according to practical needs. For preventing from the current leakage, a thickness of the CNT film is determined in a proper range. In the present embodiment, the thickness of the CNT film is in an approximate range from 1 micron to 2 millimeter.

The CNT film is formed by the following steps: (1) providing a super-aligned CNT array on a substrate; (2) scraping CNT array from the substrate to obtain the CNT particles; (3) mixing the CNT particles into a solvent to get a mixture; and (4) removing the solvent to achieve a CNT floccules, and shaping/molding the CNT floccules to obtain a CNT film.

In step (1), the super-aligned CNT is grown using a chemical vapor deposition method. The method is described in U.S. Pat. No. 7,045,108, which is incorporated herein by reference. Firstly, a substrate is provided, and the substrate is a substrate of p type silicon or n type silicon. Secondly, a catalyst layer is deposited on the substrate. The catalyst layer is made of a material selected from a group consisting of iron (Fe), cobalt (Co), nickel (Ni), and their alloys. Thirdly, the substrate with the catalyst layer is annealed at a temperature in an approximate range from 300 to 400 degrees centigrade under a protecting gas for about 10 hours. Fourthly, the substrate with the catalyst layer is heated to approximately 500 to 700 degrees centigrade and a mixed gas including a carbon containing gas and a protecting gas is introduced for about 5 to 30 minutes to grow a super-aligned CNTs array. The carbon containing gas can be a hydrocarbon gas, such as acetylene or ethane. The protecting gas can be an inert gas. The grown CNTs are aligned parallel in columns and held together by van der Waals force interactions. The CNTs array has a high density and each one of the CNTs has an essentially uniform diameter.

The super-aligned CNT array can, opportunely, have a height above 100 μm and include a plurality of CNTs parallel to each other and approximately perpendicular to the substrate. Because the length of the CNTs is very long, portions of the CNTs are bundled together. Moreover, because the super-aligned CNT array grown by the above conditions is essentially free of impurities such as carbonaceous or residual catalyst particles, and the CNTs in the super-aligned array are closely packed together by the van der Waals attractive force.

In step (2), the CNT array is scraped from the substrate by a knife or other similar devices to obtain the CNT particles. Such CNT particles are, to a certain degree, able to maintain the bundled state of the CNTs.

In step (3), the solvent is selected from the group consisting of water and volatile organic solvent. After mixing, the CNT particles are dispersed by an ultrasonic dispersion method or a high-strength agitating/vibrating method. Quite usefully, in this embodiment ultrasonic dispersion is used for about 10~30 minutes. Due to the CNT in the solvent having a large specific surface area and the bundled CNTs having a large van der Waals attractive force, the CNTs form a network structure (i.e., floccule structure).

Figure 3:
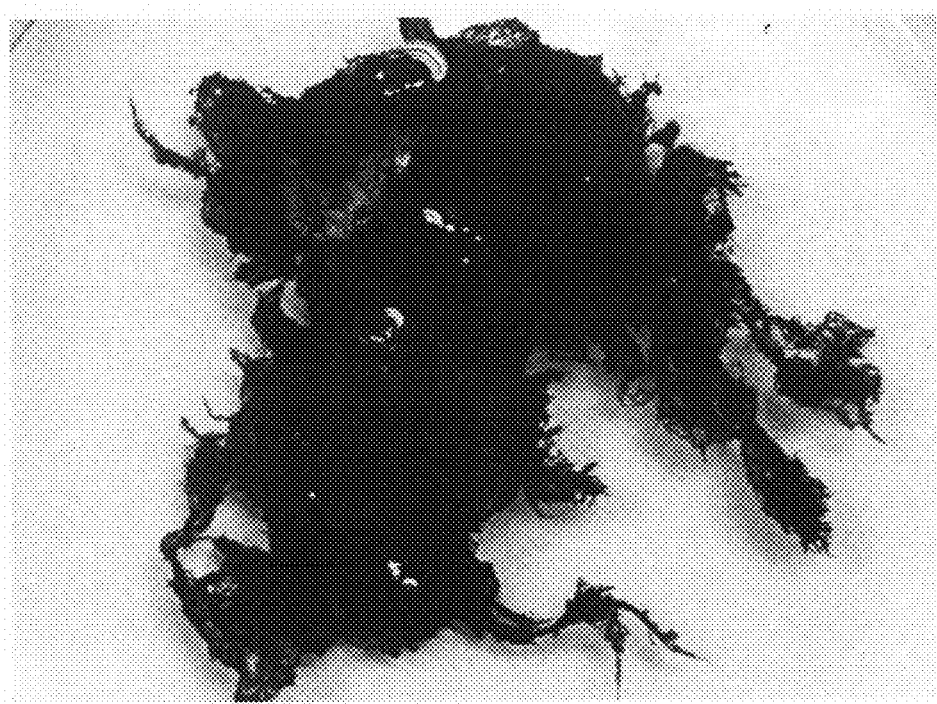
FIG. 3 is a photo, showing CNT floccules.

In step (4), the process of removing the solvent includes pouring the mixture through a filter and drying the floccules on the filter to obtain the CNT floccules. A period of drying can be selected according to practical needs. Referring to FIG. 3, the CNT floccules achieved are bundled together, so as to form a disordered flocculate structure.

The process of shaping/molding includes putting the CNT floccules into a container (not shown), pressing the CNT floccules with a certain pressure to form a desirable shape, and then removing or volatilizing the residual solvent to obtain CNT film.

Figure 4:
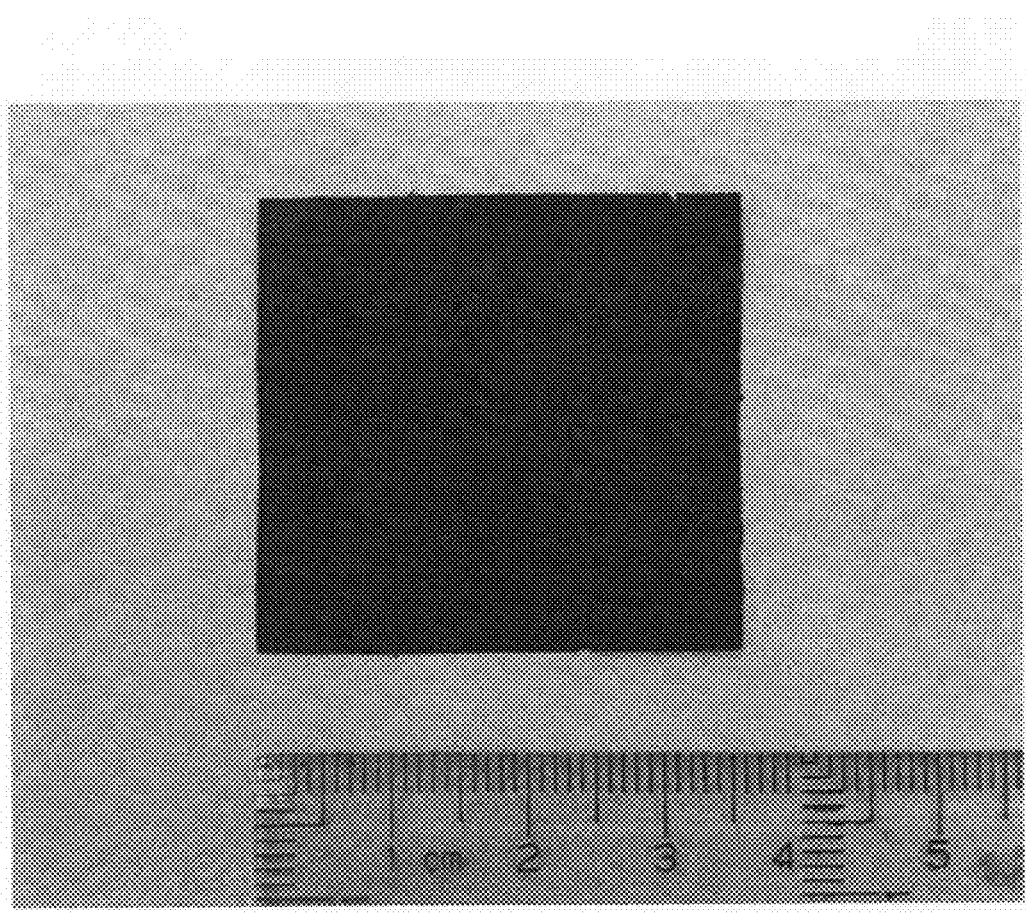
FIG. 4 is a photo, showing a CNT film.

It is to be understood that the amount of the CNT floccules is, advantageously, used to control a thickness and a surface density of the CNT film. As such, the larger the area of a given amount of the CNT floccules is spread over, the less the thickness and surface density of the CNT film. Referring to FIG. 4, a width of the CNT film is about 3.5 centimeters (cm), and a thickness thereof is about 1 millimeter (mm).

Furthermore, after step (4), the CNT film can be treated by an organic solvent, as described in U.S. Pat. Pub. No. 2007/0166223. Since the untreated CNT film has a high surface area to volume ratio, and thus may easily become stuck to other objects. That is, the CNT film is soaked in the organic solvent, and then is take out thereof. After the organic solvent volatilizing, due to factors such as surface tension, the CNTs of the CNT film is shrunk. Therefore, the stickiness of the CNT film is lowered or eliminated, and strength and toughness of the CNT film is improved. The organic solvent may be a volatilizable organic solvent, such as ethanol, methanol, acetone, dichloroethane, chloroform, and any combination thereof.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An electrolytic capacitor comprising:
   a first electrode;
   a second electrode opposite to the first electrode;
   a separator sandwiched between the first electrode and the second electrode;
   a cell accommodating the first electrode, the second electrode and the separator;
   an electrolytic solution filled into the inner space of the cell, with the first electrode, the second electrode and the separator are immersed into the electrolytic solution; and
   wherein the first electrode and the second electrode each are a CNT film, the CNT film comprises a plurality of CNTs packed closely, entangled and interconnected with each other, and disorderly arranged.

2. The electrolytic capacitor as claimed in claim 1, wherein the CNTs are uniformly dispersed in the CNT film.

3. The electrolytic capacitor as claimed in claim 1, wherein the adjacent CNTs are in contact with and connected to each other by van der Waals attractive force.

4. The electrolytic capacitor as claimed in claim 1, wherein the separator is an insulating porous material.

5. The electrolytic capacitor as claimed in claim 4, wherein the separator is made of a material selected from the group consisting of polymer material and nonwoven fiber material.

6. The electrolytic capacitor as claimed in claim 5, wherein the polymer material is selected from the group consisting of polyethylene, polypropylene, and polyolefin.

7. The electrolytic capacitor as claimed in claim 5, wherein the nonwoven fiber material is selected from the group consisting of cellulose, polyester, and polypropylene.

8. The electrolytic capacitor as claimed in claim 1, wherein the electrolytic solution is aqueous electrolytic solution or organic electrolytic solution.

9. The electrolytic capacitor as claimed in claim 1, wherein the CNT film is a porous and entangled structure.

10. The electrolytic capacitor as claimed in claim 9, wherein a pore size of the porous structure of the CNT film is less than 1 micrometer.

11. The electrolytic capacitor as claimed in claim 1, wherein the CNT film is a flexible and free-standing film.

12. The electrolytic capacitor as claimed in claim 1, wherein a thickness of the CNT film is in an approximate range from 1 micrometer to 2 millimeter.

13. The electrolytic capacitor as claimed in claim 1, wherein the CNTs of the CNT film have a height of about 100 micrometers.

14. The electrolytic capacitor as claimed in claim 1, wherein a volumetric capacitance density is more than 100 farads per gram.

15. The electrolytic capacitor as claimed in claim 1, the CNTs are substantially parallel to a surface of the CNT film.

16. An electrolytic capacitor comprising:
    a first electrode;
    a second electrode opposite to the first electrode;
    a separator sandwiched between the first electrode and the second electrode;
    a cell accommodating the first electrode, the second electrode and the separator;
    an electrolytic solution filled into an inner space of the cell, with the first electrode, the second electrode and the separator are immersed into the electrolytic solution; and
    wherein at least one of the first electrode and the second electrode comprises a plurality of CNTs entangled and interconnected with each other, and disorderly arranged.

17. The electrolytic capacitor as claimed in claim 16, wherein the CNTs are closely packed together by van der Waals attractive force to form a carbon nanotube film.

18. The electrolytic capacitor as claimed in claim 17, wherein the carbon nanotube film is a free-standing film due to the van der Waals attractive force between the CNTs.

19. The electrolytic capacitor as claimed in claim 16, wherein the CNTs form a network structure.

20. An electrolytic capacitor comprising:
    a first electrode;
    a second electrode opposite to the first electrode;
    a separator sandwiched between the first electrode and the second electrode;
    a cell accommodating the first electrode, the second electrode and the separator; and
    an electrolytic solution filled into the inner space of the cell, with the first electrode, the second electrode and the separator are immersed into the electrolytic solution;
    wherein at least one of the first electrode and the second electrode is a CNT film, the CNT film comprises a plurality of CNTs entangled and interconnected with each other by van der Waals attractive force, and the CNTs are disorderly arranged.

* * * * *